BINARY CODE-TO-SINE VOLTAGE PHASE CONVERTER
Filed March 4, 1964
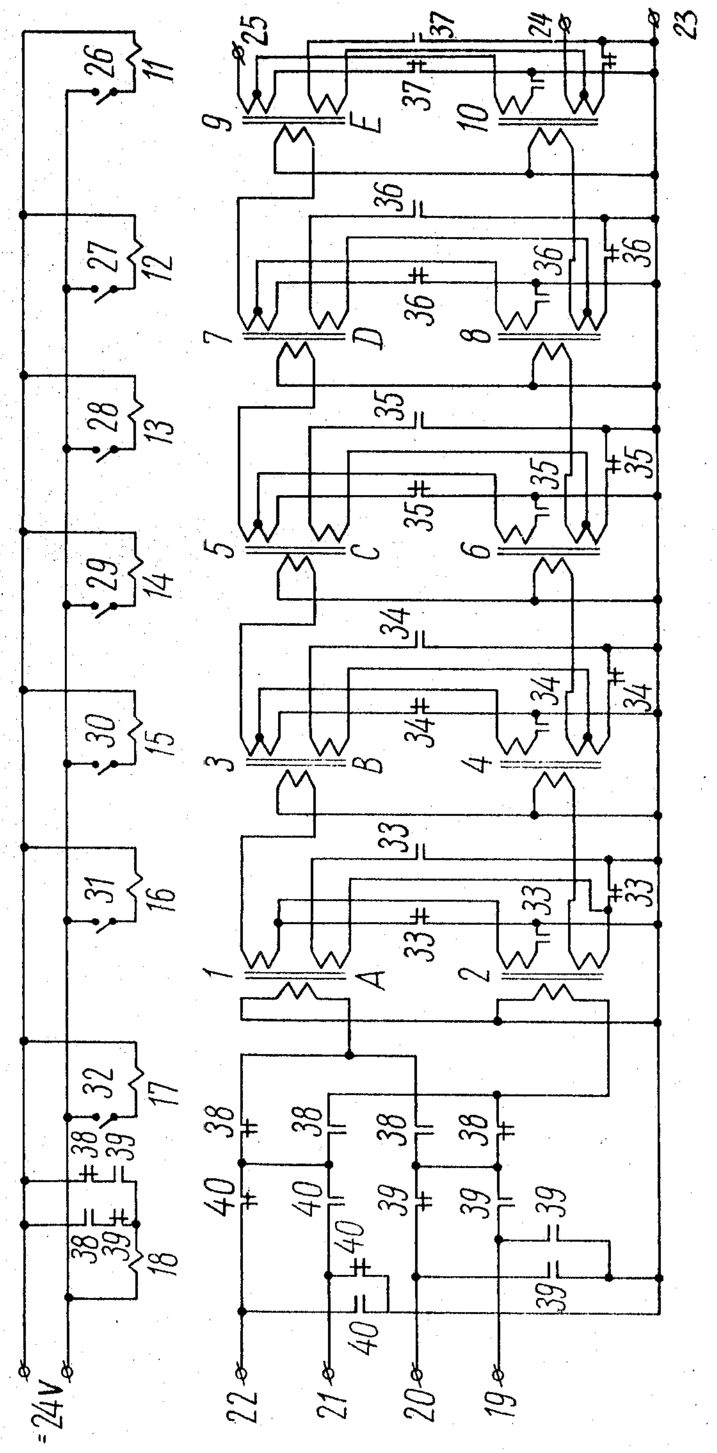

United States Patent Office 3,456,253

Patented July 15, 1969

3,456,253
BINARY CODE-TO-SINE VOLTAGE PHASE CONVERTER

Shimon Abramovich Vainer, Samarskaja Str. 191, and Savely Abramovich Vainer, Tsimijanskaja Str. II, Apt. 64, both of Volgorad, II, U.S.S.R.

Filed Mar. 4, 1964, Ser. No. 349,344

Int. Cl. H04l *3/00;* H03k *13/00*

U.S. Cl. 340—347 4 Claims

The present invention relates to digit-to-analog converters for converting a binary code to a sine voltage phase.

The invention is intended for use in position systems of program controls.

It is known that hitherto two versions of code-to-phase digital-to-analog converters were used, one employing network circuits comprising stage-connected phase shift cells consisting of active and reactive elements, and the second being based on the use of multidigit adders and binary counters.

The first version is disadvantageous mainly in that it requires intermediate electronic amplifying elements, employed to compensate energy losses at cell resistances and neutralize the influence of foregoing cells on subsequent cells; it operates with errors due to variations of the supply line frequency, ambient temperature fluctuations and, also, due to variable degree of asymmetry of the three-phase voltage fed to the position pickup, because in the latter case the phase of the comparison voltage, recorded at the pickup, is shifted with respect to the phase of the instruction voltage.

The disadvantages of the second version are: necessity to maintain stable supply voltage, sensitivity to high-frequency pulse disturbances resulting in faulty operation of trigger cells; need for a great number of electronic and semiconductor devices; sensitivity to temperature fluctuations when transistors are used and need for special filters for converting square-wave voltage into sine-wave voltage.

Although attempts have been made to overcome the above shortcomings, they have, as far as we know, all failed to produce the desired result.

It is, therefore, an object of the present invention to eliminate the above-mentioned shortcomings, to reduce the amount of equipment, to provide a cheaper system, to produce a static equivalent of a magslip, operating in the phase shifter duty.

Another object of this invention is to ensure linear conversion of a binary code to a voltage phase at a commercial line frequency.

Still another object of this invention is to eliminate rotating elements and electronic amplifying elements in the "code-to-phase" converter.

Yet another object of this invention is to achieve high-accuracy presetting of angular values in operation together with a magslip, utilized as a phase-shifter.

A further object of this invention is to eliminate sensitivity of the converter to supply line frequency oscillations, ambient temperature fluctuations and errors arising from supply line asymmetry.

An object of this invention is also to simplify and increase reliability of program control position systems, comprising conventional position pickups of the magslip type.

According to the above and other objects, the invention consists of a new device, comprising transformer phase shift cells, fed from a multiphase reference voltage system, and commutating relays, as described here and below and claimed in the appended claims, with the understanding, however, that modifications in the exact embodiment as disclosed herein may be made without departing from the spirit and scope of the invention.

Other objects and advantages of the invention will become apparent from the following description and the appended drawing which shows the principal diagram of the binary code-to-sine voltage phase converter.

The converter comprises five transformer phase shift cells, viz.: A with transformers 1, 2; B, 3, 4; C, 5, 6; D, 7, 8; E, 9, 10; and a relay circuit consisting of eight relays 11, 12, 13, 14, 15, 16, 17 and 18.

Each cell consists of two transformers, having one primary and two secondary windings. Primary windings of the transformers in every cell are energized with two voltages having equal amplitudes and a 90° phase shift with respect to each other.

Each secondary winding of one transformer in a cell is connected in-series through the above-mentioned relay circuit to the respective secondary winding of the second transformer in the same cell.

When geometrically added up, the definite values of voltages in the secondary windings depending on the voltage ratios produce two new voltages equal in amplitude but shifted at an angle of $\pi/2$ with respect to each other and turned by a definite angle from voltages fed to the primary windings.

In-series connection of said cells, serving as reference ones for certain phase shifts, permits to transform the system of two reference voltages, shifted at $\pi/2$ with respect to each other and applied to terminals 19, 20, 21 and 22, into two other voltages, taken at points 23, 24 and 25, and also shifted at $\pi/2$ with respect to each other and turned from the initial voltages at an angle corresponding to a digit, introduced by lamels 26, 27 28, 29, 30, 31 and 32.

For preserving the constant number of cells irrespective of the number of the converted digits, recorded in the binary code, each cell does not initiate a phase shift at no current in the winding of a respective relay. This is achieved by connecting the second winding of the first cell transformer through normally closed relay contacts 33, 34, 35, 36, 37 corresponding to the cell, in lieu of the secondary winding of the second cell transformer to an additional section thereof, and consequently said cell switches over for the conventional transformer duty.

Since the number of cells is retained irrespective of the number of the converted digits, conversion errors are precluded at variations of the total magnetizing current, consumer by the converter.

The total number of cells in the converter is five (A, B, C, D, E). Voltage ratios of transformers, incorporated in the cells, are selected so that upon actuation of relay 11 cell E makes a $2\pi/2^3$ shift, upon actuation of relay 12 cell D makes a $2\pi/2^4$ shift, upon actuation of relay 13 cell C makes a $2\pi/2^5$ shift, upon actuation of relay 14 cell B makes a $2\pi/2^6$ shift, upon actuation of relay 15 cell A makes a $2\pi/2^7$ shift.

$\pi/2$ and $\pi$ shifts are achieved by switching over the phases of the input reference voltages, applied to terminals 19, 20, 21, 22 by means of relay contacts 38, 39 and 40.

Consequently, the converter makes it possible to achieve any phase shift within 0 to $2\pi$, multiple to an angle $2\pi/2^7$.

The characteristic feature of the described invention is the use of a multiphase (for instance a two-phase) system of reference voltages, wherein vectors are turned by adding up initial voltage components in transformer phase shift cells without any active and reactive elements or intermediate amplifying elements. Thanks to the above the device acquires the properties of a magslip static equivalent, operating in the phase shifter duty.

The description of the closure of relay contacts for achieving the required phase shift follows.

When relay 11 is energized, its contacts 37 transfer the cell E from the state in which it created a zero phase shift to a state in which the phase shift is $2\pi/2^4$.

When relay 12 is energized, its contacts 36 change the cell D from the state in which it created a zero phase shift to a state in which the phase shift is $2\pi/2^4$.

Upon switching-in of relay 13, its contacts 35 shift the cell C from the state in which no phase shift was made to a state in which the phase shift is $2\pi/2^5$.

The switching-in of relay 14 causes its contacts 34 to transfer the cell B from the state in which no phase shift was made to a state in which it creates a $2\pi/2^6$ phase shift.

When relay 15 is energized its contacts 33 transfer the cell A from the state in which it created a zero phase shift to a state in which the phase shift is $2\pi/2^7$.

The operating principle of each transformer cell serving to provide the required phase shift of the two-phase voltage is described in detail above.

As will be understood from the circuit diagram, the switching-in of relay 16 causes its contacts 38 to operate relay 18, contacts 38 of relay 16 and contacts 40 of relay 18 connecting the end of the primary winding of transformer 1 in the cell A from terminal 22 to terminal 20, and the other end of the same winding, together with one of the ends of the primary winding of transformer 2 in the cell A is switched over from terminals 19, 21 to terminals 19, 22, while the second end of the primary winding of transformer 2 in the cell A is changed over from terminal 20 to terminal 21.

The above switching-over causes a $\pi/2$ shift of the supply two-phase voltage system.

With relay 16 deenergized and relay 17 switched on, contacts 39 of the latter switch on relay 18, contacts 39 and 40 of these relays shifting the end of the primary winding of transformer 1 in the cell A from terminal 22 to terminal 21, and the other end of the same winding, together with one of the ends of the primary winding of transformer 2 in the cell A from terminals 19, 21 to terminals 20, 22; and the other end of the primary winding of transformer 2 in the cell A is shifted from terminal 20 to terminal 19.

The above switching-over causes a $\pi$ shift of the supply two-phase voltage system.

With relays 16 and 17 switched on, relay 18 remains de-energized, contacts 38 of relay 16 and contacts 39 of relay 17 shifting the end of the primary winding of transformer 1 in the cell A from terminal 22 to terminal 19; the other end of the same winding, together with one of the ends of the primary winding of transformer 2 in the cell A, from terminals 19, 21 to terminals 20, 21; and the other end of the primary winding of transformer 2 in the cell A is switched over from terminal 20 to terminal 22.

The switch-over causes a $2\pi/3$ shift of the supply two-phase voltage system.

The present invention ensures: linear conversion of a binary code to a sine voltage phase over the range from 0 to $2\pi$ due to stage-connected cells, whose number is constant irrespective of the number of the converted digits and, also, due to the constant total magnetizing current, consumed by the converter; elimination of rotating elements and intermediate electronic amplifying elements through utilizing transformer phase shift cells, fed by a two-phase voltage; insensitivity to supply line frequency oscillations and ambient temperature fluctuations, because the device consists of siimlar elements with equal frequency and temperature characteristics; absence or errors, arising from the supply line asymmetry in operation together with a magslip, because said device is a static equivalent of a magslip, operating in phase shifter duty, and also because similar position of rotors of the magslips, connected in a similar manner, ensures equal phase of comparison voltages, recorded at said magslip, irrespective of any asymmetry of the supply line; possibility to divide the phase angle by any value, required in practice, the output voltage amplitude being invariable.

The described converter can be utilized in position systems of program control, e.g., of metal cutting machine tools, in lieu of the generally employed selsyn transformer equivalent, producing a system of two or three in-phase voltages with a definite amplitude relationship, corresponding to the preset rotor turning angle of the selsyn pickup, which is a stage connection of special transformers, realizing the following relationships:

$$\mathrm{Sin}(\alpha+\beta+\gamma)$$

and $$\mathrm{Cos}(\alpha+\beta+\gamma)$$

where $\alpha,\beta,\gamma$=are the digits of the input number.

Said prior art system is disadvantageous in view of the following: it requires special transformers, that have many taps; a great number of step-by-step switches and complicated commutation are necessary; there is a possibility errors because, in obtaining low digits, the small value of the recorded voltage may escape commutation by the contacts of the switching devices; variable core losses may influence the recorded voltages, when transformer sections are switched over; high-speed operation is limited by the time, required for selecting the lamels of step-by-step switches.

The present invention also permits to eliminate diverse functional gears, such as measuring electromechanical followup systems, from program control position systems.

A position system, based on converter described above has a minimum number of electronic tubes and switching devices, as compared to any of the existing systems serving analogous purposes.

This converter can also be employed in systems for remote transmission of high-accuracy angular values.

Although the present invention has been described in accordance with the preferred embodiment, it will be understood that changes and modifications can be made without departing from the spirit and scope of the invention, which will be readily understood by those skilled in the art.

Such changes and modifications are considered to be within the spirit and scope of the invention and the appended claims.

What is claimed is:

1. A binary code-to-sine voltage phase converter, comprising commutating relays including windings, a supply line, an input device, and transformer cells, and a multiphase reference voltage system, said windings being connected to said supply line through said input device and cells, fed from said multiphase system.

2. A binary code-to-sine voltage phase converter, comprising commutating relays including windings, a supply line, an input device, and transformer cells, and a multiphase reference voltage system and stage-connected, each of said cells comprising two transformers, including one primary and two secondary windings, connected in-series by means of said commutating relays, said windings being connected to said supply line through said input device and cells, fed from said multiphase system.

3. A binary code-to-sine voltage phase converter, comprising commutating relays including windings, a supply line, an input device, and transformer cells, a multiphase reference voltage system and stage-connected, each of said cells compprising two transformers including one primary and two secondary windings, connected in-series by means of said commutating relays all said cells being indispensably switched in irrespective of the number of the converted digits, said windings being connected to said supply line through said input device and cells, fed from said multiphase system.

4. A binary code-to-sine voltage phase converter, comprising commutating relays including windings, a supply line, an input device, and transfomer cells, and a multiphase reference voltage system and stage-connected, each of said cells comprising two transformers with one primary and two secondary windings, connected in-series by means of said commutating relays, all said cells being indispensably switched in irrespective of the number of the converted digits, whereas at "zero" input in the respective digits said cells are switched over from the phase shift duty to the transformer duty, said windings being connected to said suppy line through said input device and cells, fed from said multiphase system.

References Cited

UNITED STATES PATENTS 2,881,419 4/1959 Rothbart ----------- 340—347

MAYNARD R. WILBUR, Primary Examiner

WM. KOPACZ, Assistant Examiner